United States Patent [19]

Zhong et al.

[11] Patent Number: 5,395,904
[45] Date of Patent: Mar. 7, 1995

[54] PROCESS FOR PROVIDING HOMOGENEOUS COPOLYMERS OF VINYLPYRROLIDONE AND VINYL ACETATE WHICH FORM CLEAR AQUEOUS SOLUTIONS HAVING A HIGH CLOUD POINT

[75] Inventors: Yuanzhen Zhong, Wayne, N.J.; Hemant Parikh, Harriman, N.Y.; Terry E. Smith, Murray, Ky.

[73] Assignee: ISP Investments Inc., Wilmington, Del.

[21] Appl. No.: 163,446

[22] Filed: Dec. 7, 1993

[51] Int. Cl.6 .................. C08F 226/10; C08F 218/08; C08F 4/34
[52] U.S. Cl. ................................... 526/264; 526/330; 526/227
[58] Field of Search ............... 526/264, 330, 227

[56] References Cited

U.S. PATENT DOCUMENTS 4,520,179  5/1985  Barabas et al. .............. 526/212
5,122,582  6/1992  Potthoff-Karl et al. ............. 526/81

*Primary Examiner*—Joseph L. Schofer
*Assistant Examiner*—Wu C. Cheng
*Attorney, Agent, or Firm*—Walter Katz; Marilyn J. Maue; Joshua J. Ward

[57] ABSTRACT

A process for making homogeneous copolymers of vinylpyrrolidone (VP) and vinyl acetate (VA) which form clear aqueous solutions and have high cloud points. The process involves precharging VP and VA monomers in a predetermined ratio, and then feeding VP and VA at a predetermined rate, the ratio of the components in the initial charge and the feeding rates for the monomer being selected in accordance with the reactivity rates of the monomers towards copolymerization as opposed to homopolymerization.

11 Claims, No Drawings

PROCESS FOR PROVIDING HOMOGENEOUS COPOLYMERS OF VINYLPYRROLIDONE AND VINYL ACETATE WHICH FORM CLEAR AQUEOUS SOLUTIONS HAVING A HIGH CLOUD POINT

1. FIELD OF THE INVENTION

This invention relates to a process for making copolymers of vinylpyrrolidone (VP) and vinyl acetate (VA), and, more particularly, to homogeneous copolymers of VP and VA which can form clear aqueous solutions having high upper cloud points.

2. DESCRIPTION OF THE INVENTION

Copolymers of vinylpyrrolidone (VP) and vinyl acetate (VA) monomers have significant utility in the pharmaceutical and cosmetic industries. Generally, these copolymers are prepared by a batch process in which selected amounts of the vinylpyrrolidone and vinyl acetate monomers are charged in ethanol or isopropanol as solvent and tert-butyl peroxypivalate (Lupersol 11) as initiator and heated to a reaction temperature for several hours. For these uses, however, it is necessary that the copolymer be present as clear aqueous solutions. This property is characteristic of a copolymer having a substantially homogeneous structure.

Homogeneous copolymers of VP and VA are difficult to prepare because vinylpyrrolidone is a significantly more active monomer during the polymerization than the vinyl acetate monomer. Accordingly, VP monomer will react faster and go into the copolymer chains first as VP units. The VA monomer will react later leading to formation of VA blocks in the copolymer. Since VA is much less water soluble than VP, the presence of VA blocks in the heterogeneous copolymer will reduce its water solubility appreciably. The resultant copolymer thus will appear cloudy in water solution. Such cloudy solutions are indicative of polymers having a low cloud point, i.e. they appear cloudy at room temperature.

U.S. Pat. No. 5,122,582 attempted to produce homogeneous copolymers of VP and VA by continuously removing unreacted vinyl acetate with superheated steam; however, this step reduced the conversion yield and gave only copolymers having a variable composition.

British patent 1,323,028 describes a homogeneous VP/VA copolymer prepared by an intricate process employing a continuous phase in which VP is soluble and a disperse phase in which VA is suspended. Copolymerization takes place exclusively in the disperse phase while the continuous phase functions as a VP reservoir. Although successful in producing a homogeneous product, this process, using AIBN initiator, is extremely limited in the choice of solvents for the disperse phase, e.g. benzene, toluene and for the continuous phase, e.g. acids or polyols, and is further complicated by the need for the removal of both solvents and substantial portions of VP monomer in the continuous phase. Additionally, this process, employing the VA reservoir, fails to maximize the reactive efficiency of the VA monomer.

Accordingly, it is an object of this invention to provide a process for making homogeneous copolymers of vinylpyrrolidone and vinyl acetate monomers of predetermined composition which form clear aqueous solutions at a high solids level indicative of polymers having a high upper cloud point.

Another object herein is to provide VP/VA copolymers of predetermined compositions by precharging and feeding the two monomers in amounts and at individual rates which are predetermined by their respective reactivities towards copolymerization as opposed to homopolymerization.

These and other objects and features of the invention will be made apparent from the following more particular description of the invention.

SUMMARY OF THE INVENTION

A process is described for making homogeneous copolymers of vinylpyrrolidone (VP) and vinyl acetate (VA) which can form clear aqueous solutions at room temperature. The process involves precharging VP and VA monomers in a predetermined ratio and then feeding VP and VA at a predetermined rate, the ratio of the components in the initial charge and the feeding rates for the monomers being selected in accordance with the reactivity ratios of the monomers towards copolymerization as opposed to homopolymerization.

DETAILED DESCRIPTION OF THE INVENTION

VP and VA are monomers with quite different properties. VP monomer, and VP homopolymers, i.e. PVP, are soluble in water because they can form hydrogen bonds between nitrogen atoms and water molecules. VA monomer, on the other hand, does not form hydrogen bond with water; accordingly, its hydrophobic organic groups result in water insolubility. VA homopolymers, even with low molecular weights, also are water insoluble. Thus, to provide a P(VP/VA) copolymer which is soluble in water, the VA units need help from the VP units. For example, in a homogeneous P(VP/VA) copolymer of predetermined composition, e.g. a monomer weight ratio of 60:40, corresponding to a molar ratio of 0.53:0.47, the VP and VA unit ratio is about 1:1. A homogeneous (or alternating) copolymer at this ratio will have good solubility in water. However, if this copolymer composition is heterogeneous, i.e. there is a large number of VA unit blocks in the chains, produced by homopolymerization, the copolymer will have poor solubility in water.

The reactivities of VP and VA monomers towards copolymerization, as opposed to homopolymerization, also are quite different. Using the values of Q (a measure of the resonance stabilization) and e (a measure of polar property) of these monomers, available in the literature (G. Odian, Principles of Polymerization, 3rd Ed., John Wiley & Sons, 1992, New York), the reactivity ratios r (defined as the reaction rate towards copolymerization as opposed to homopolymerization) of VP and VA monomers can be calculated as follows:

|  | e | O |
|---|---|---|
| Monomer 1 (VP) | −1.14 | 0.14 |
| Monomer 2 (VA) | −0.22 | 0.026 | and the Price-Alfrey Equations:

$$r_1 = \frac{Q_1}{Q_2} \exp[-e_1(e_1 - e_2)]$$

-continued $$r_2 = \frac{Q_2}{Q_1} \exp[-e_2(e_2 - e_1)]$$

| Monomer | Reactivity Ratios | |
|---|---|---|
| | $r_1$ | $r_2$ |
| VP | 1.89 | |
| VA | | 0.227 |

These $r_1$ and $r_2$ values indicate that VP is much more reactive towards copolymerization than VA. Accordingly, VP monomer will form copolymer chains faster than VA monomer. Thus, in a batch process, where both monomers are added at the beginning of the copolymerization reaction, the VP monomer will react first leaving VA monomer to react later. VP homopolymer thereby will be made at the beginning of the process and VA homopolymer will be made at the end of the process. The resultant copolymer will be heterogeneous with large VA blocks therein. These VA blocks will contribute to its insolubility in water, overcoming the VP blocks, and the copolymer will be substantially insoluble in water.

In this invention, in contrast to batch processes, homogeneous copolymers are prepared by precharging the monomers in a defined ratio, and then gradually feeding larger amounts of the more reactive monomer to the reaction mixture according to the following copolymerization equations:

$$F_1 = \frac{r_1 f_1^2 + f_1 f_2}{r_1 f_1^2 + 2 f_1 f_2 + r_2 f_2^2} \quad (1)$$

$$F_2 = \frac{r_2 f_2^2 + f_1 f_2}{r_1 f_1^2 + 2 f_1^2 + 2 f_1 f_2 + r_2 f_2^2} \quad (2)$$

where
$F_1$: mole fraction of monomer 1 in the copolymer;
$F_2$: mole fraction of monomer 2 in the copolymer;
$r_1$: reactivity ratio for monomer 1;
$r_2$: reactivity ratio for monomer 2;
$f_1$: mole fraction of monomer 1 in the feed;
$f_2$: mole fraction of monomer 2 in the feed.

These equations give the instantaneous copolymer composition, and the mole fraction of monomer 1 and monomer 2 in the copolymer ($F_1$ and $F_2$), when the feed compositions ($f_1$ and $f_2$) and monomer reactivity ratios ($r_1$ and $r_2$) are known.

For a P(VP/VA) copolymer having a monomer weight ratio of 60:40, i.e. a mole ratio of 0.53:0.47, the monomer mole fractions in the copolymer are $F_1=0.53$ and $F_2=0.47$. However, these values are the overall mole fraction in the copolymer product when the copolymerization reaction is completed. In order to obtain a homogeneous product, the instantaneous $F_1$ and $F_2$ values during the entire polymerization process should be substantially the same as these overall values. The instantaneous $F_1$ and $F_2$ values, in turn, depend upon the instantaneous monomer mole fractions in the feeds, i.e. $f_1$ and $f_2$.

$F_1$ and $F_2$ can be used to calculate $f_1$ and $f_2$, as follows:

Rearranging equations (1) and (2) above, the following equation (3) for $f_1/f_2$ can be obtained.

$$\left(\frac{f_1}{f_2}\right) = \frac{(F_1 - F_2) + [(F_2 - F_1)^2 + 4F_1F_2r_1r_2]^{\frac{1}{2}}}{2F_2r_1} \quad (3)$$

and, since:

$$f_1 + f_2 = 1 \quad (4)$$

$f_1$ and $f_2$ then can be calculated directly from the $F_1$ and $F_2$ values. For example, in a copolymer having a 60:40 weight ratio, the mole fractions in the copolymer are $F_1=0.53$ and $F_2=0.47$. The corresponding mole fractions of monomers in the feeds, $f_1$ and $f_2$, then must be:
$f_1=0.29$ (34.5 by weight);
$f_2=0.71$ (65.50 by weight); and
$f_1/f_2=0.527$ by weight, Accordingly, in the process herein, the mole fractions of the VP and VA monomers in the initial charge (precharge) are the $f_1$ and $f_2$ values calculated from the above equations. After copolymerization commences, however, the individual monomers are continuously fed into the precharge composition based upon their respective consumption ratio. Theoretically, this consumption ratio should be 60/40 by weight; however it was determined experimentally during polymerization as follows:

GC samples of the polymerization mixture were taken to determine the amounts of residual monomers present in the mixture, i.e. the amounts of VP and VA unreacted. Since the amounts of VP and VA added were known, the amounts and ratio of VP and VA reacted into copolymer then could be calculated by difference. This VP/VA ratio reacted should be as close as possible to the ideal ratio of 1.5 by weight in the final product.

The examples given below demonstrate that the process according to the invention generated homogeneous PVP/VA copolymers with controlled monomer distribution in the polymer chains. Specifically, VP and VA copolymers of having a weight of 60 to 40 had excellent solubility in water, e.g. 10% and 25% by weight aqueous copolymer solutions were clear (turbidity below 11 ntu, a rephelometric turbidity unit, as measured by the HACH ratio turbidimeter), were substantially colorless. By using the process of this invention, the cloud point of the copolymer solutions substantially exceed room temperature, i.e. the cloud points are about 60°–80° C.

The solvent for polymerization during the process according to the invention can be either alcohol (ethanol or isopropanol) or a mixture of alcohol and water (the water content can range from 0% to 50% by weight based on the total amount of solvent).

The process according to the invention is illustrated below by the preparation of VP/VA copolymers comprising (a) 60% to 80% by weight VP and (b) 20% to 40% by weight VA, having K values ranging from about 10 to about 40, corresponding to number average molecular weights of about 6,000 to about 50,000, respectively, dependent upon the polymer content.

The overall process according to the invention preferably consists of the following several steps:
(A) Polymerization (discussed above);
(B) Post-treatment (to reduce residual monomers to less than 100 ppm);
(C) Solvent exchange (to replace the organic solvent by water);
(D) Drying (to obtain the product in powder form).

While the examples given below describe VP/VA copolymers in a VP and VA weight ratio of 60:40, the process of the invention can be used to make any homogeneous copolymer from monomers having different reactivity activities.

EXAMPLE 1

A. Copolymerization
B. Post-Treatment

A 1-liter Buchi reactor was purged with nitrogen and the initial charge (Heel) was pumped into the reactor. The reactants were stirred at 150 rpm and heated to 85° C. Then Feeds 1 and 2 were introduced simultaneously. After addition of Feed 1 was finished, Feed 3 was started immediately. After addition of Feeds 2 and 3 were completed, the batch was held at 85° C. for 2 hours. Then the temperature was raised to 130° C. to start a post-treatment stage. The batch then was maintained at 130° C. for another 3 hours and Feed 4 was added to dilute the system to 50%. After Feed 4 was completed the temperature was held at 130° C. for another 3 hours. Then the reactor was cooled down and the intermediate product (a 50% solution in isopropanol) was discharged.

The process of Example 1 is summarized below:

|  | Heel | Feed 1 | Feed 2 | Feed 3 | Feed 4 |
| --- | --- | --- | --- | --- | --- |
| Time (hour) | — | 3.5 | 5.0 | 1.0 | 1.5 |
| Chemicals (gms) | | | | | |
| VP | 60.73 | 94.99 | — | 51.91 | — |
| VA | 55.12 | 86.21 | — | — | — |
| Vazo 67 (2,2'Azobis-2-Methylbutane nitrile) | 0.14 | — | 0.91 | — | — |
| Lup 101 (2,5-dimethyl-2,5-di(t-butylperoxy)hexane) | 0.14 | — | 0.91 | — | — |
| IPA | 59.83 | 91.02 | 10.96 | 26.08 | 161.05 |

The polymerization concentration was 65%, with 25% VP in Feed 3; and 0.15% of each initiator (based on the weight of total batch) was used. The amount of the initial charge was 25.1% by weight of the total batch.

C. Solvent Exchange
D. Drying 100 g of the copolymer product and 600 g of distilled water then were admixed at 1 atmosphere pressure. The mixture was held until the vapor temperature reached 100° C. Distillation was continued until 300 g of distillate was collected. The aqueous solution after solvent exchange, which contained about solids, was frozen and dried to provide the copolymer product in powder form.

The product was a white powder, without odor, free of haze in 5% ethanol solution, a residual VP and VA below 100 ppm, and a K value of 24.5; good solubility in water (its aqueous solution is very clear). The HACH measurement at room temperature on a 10% aqueous solution was 7.9 ntu. The cloud point was 40° C.

EXAMPLE 2

Example 1 was repeated with the exception that 15% VP was present in Feed 3. The process is summarized below.

|  | Heel | Feed 1 | Feed 2 | Feed 3 | Feed 4 |
| --- | --- | --- | --- | --- | --- |
| Time (hour) | — | 3.5 | 5.0 | 1.0 | 1.5 |
| Chemicals (gms) | | | | | |
| VP | 52.94 | 123.54 | — | 31.14 | — |
| VA | 42.40 | 98.93 | — | — | — |
| Vazo 67 | 0.11 | — | 0.95 | — | — |
| Lup 101 | 0.11 | — | 0.95 | — | — |
| IPA | 49.16 | 111.76 | 11.34 | 15.65 | 161.05 |

The product was a white powder, no odor, free of haze in 5% ethanol solution, residual VP and VA below 100 ppm, K value 28.3; good solubility in water; the aqueous solution was clear. The HACH measurement at room temperature on a 10% aqueous solution was 10.2 ntu; on a 5% aqueous solution it was 13.7 ntu. The cloud point was 40° C.

EXAMPLE 3

Example 1 was repeated with the exception that the polymerization concentration was 75%. The process involved:

|  | Heel | Feed 1 | Feed 2 | Feed 3 | Feed 4 |
| --- | --- | --- | --- | --- | --- |
| Time (hour) | — | 3.5 | 5.0 | 1.0 | 1.5 |
| Chemicals (gms) | | | | | |
| VP | 46.72 | 109.00 | — | 51.91 | — |
| VA | 42.40 | 98.93 | — | — | — |
| Vazo 67 | 0.11 | — | 0.95 | — | — |
| Lup 101 | 0.11 | — | 0.95 | — | — |
| IPA | 27.75 | 61.80 | 11.34 | 15.43 | 232.63 |

The product was a white powder, no odor, free of haze in 5% ethanol solution, residual VP and VA below 100 ppm, and K value 27.9, good solubility in water, and the aqueous solution was clear. The HACH values at room temperature on a 10% aqueous solution was 6.8 ntu; on a 25% aqueous solution it was 7.9 ntu. The cloud point was 40° C.

EXAMPLE 4

In this example, the heel was heated to 85° C., and Feeds 1, 2 and 3 were started through 3 pumps simultaneously. After the 3 feeds were completed, the temperature was held at 85° C. for 2 hours. Then the temperature was raised to 130° C. to start the post-treatment stage, as in Example 1. The polymerization concentration was 60%.

The process of Example 4 is summarized below:

|  | Heel | Feed 1 | Feed 2 | Feed 3 | Feed 4 |
| --- | --- | --- | --- | --- | --- |
| Time (hour) | — | 3.5 | 5.0 | 1.0 | 1.5 |
| Chemicals (gms) | | | | | |
| VP | 29.79 | — | 177.83 | — | — |
| VA | 56.53 | 84.79 | — | — | — |
| Vazo 67 | 0.13 | — | — | 0.92 | — |
| Lup 101 | 0.13 | — | — | 0.92 | — |
| IPA | 55.99 | 53.47 | 112.13 | 11.04 | 116.32 |

The product was a white powder, no odor, free of haze in 5% ethanol solution, residual VP and VA below 100 ppm, K value 23.0, good solubility in water; its aqueous solution was clear. The HACH value at room temperature for a 10% aqueous solution was 4.8 ntu; on a 25% aqueous solution it was 6.9 ntu. The cloud point was 60° C.

EXAMPLE 5

In this example, the heel was heated to 85° C., and Feeds 1, 2, 3 and 4 were started through 3 pumps simultaneously. After the 4 feeds were completed, the temperature was raised to 130° to start the post treatment stage as in previous examples.

The process of Example 5 is summarized below:

|  | Heel | Feed 1 | Feed 2 | Feed 3 | Feed 4 | Feed 5 |
|---|---|---|---|---|---|---|
| Time (hour) | — | 4.5 | 3.5 | 5.0 | 4.5 | 1.5 |
| Chemicals (gms) |  |  |  |  |  |  |
| VP | 36.80 | 170.82 | 81.97 | — | — | — |
| VA | 59.36 | — | — | — | — | — |
| Vazo 67 | 0.14 | — | — | 0.91 | — | — |
| Lup 101 | 0.14 | — | — | 0.91 | — | — |
| IPA | 50.04 | — | — | 10.86 | 126.99 | 161.05 |

The product was a white powder, no odor, free of haze in 5% ethanol solution, residual VP and VA below 100 ppm, K value 28.0, good solubility in water; its aqueous solution was clear. The HACH value at room temperature for a 10% aqueous solution was 5.0 ntu; on a 25% aqueous solution it was 6.5 ntu. The cloud point was higher than 80° C.

Comparing Examples 1–5

In Examples 1–5, Vazo 67 (instead of Lupersol 11) was used as initiator.

In Examples 1–3, the VP and VA additions in Feed 1 were made simultaneously, the VP and VA ratios in the initial charge and during continuous feeding (Feed 1) were 1:1. This ratio was far from the theoretical value of 0.53 for the initial charge and 1.5 for the continuous feeding. The cloud point was 40° C.

In Example 4, however, the VP and VA additions were made separately, and the VP to VA ratio in the initial charge was 0.53. Kinetics analysis showed that the VP and VA fractional conversion ratio after initial charge was 0.99, which was 0.48 lower than the ideal conversion ratio of 1.47. The cloud point was raised to 60° C.

In Example 5, the VP and VA monomers and IPA were fed in separate streams and each stream was adjusted independently. The VP to VA ratio in the initial charge was set at 0.62, slightly higher than the theoretical value of 0.53. Kinetics analysis indicated that the VP and VA fractional conversion ratio upon polymerization of the initial charge was 1.72, which was only 0.25 higher than the ideal conversion ratio of 1.47. Furthermore, such kinetics analysis showed that the VP and VA conversion ratio during the entire polymerization process was close to the ideal value of 1.5. The copolymer product obtained thereby had a homogeneous microstructure with a maximized cloud point of over 80° C.

EXAMPLE 6

Lupersol 554 (t-amylperoxypivalate) was used as initiator (instead of Vazo 67), the polymerization temperature was 70° C. (instead of 85° C.), ⅓ of the VP was retained in Feed 3, and the polymerization concentration was 70%. The product was a white powder, no odor, free of haze in 5% ethanol solution, residual VP and VA below 100 ppm, K value 34.0, a clear aqueous solution, APHA color measurement on 10% aqueous solution: 32.

EXAMPLES 7 & 8

A mixture of water and isopropanol was used as the polymerization solvent. The K values obtained on the product were:

| Example | % Water | K Value |
|---|---|---|
| 6 | 0% | 34.0 |
| 7 | 15% | 38.3 |
| 8 | 50% | 42.4 |

What is claimed is:

1. A process for making substantially homogeneous copolymers of vinylpyrrolidone and vinyl acetate which form clear aqueous solutions having a high cloud point substantially in excess of room temperature by polymerization of the monomers in a water miscible organic solvent in the presence of a radical initiator, which comprises:
   (a) precharging a reactor with predetermined initial amounts of vinylpyrrolidone and vinyl acetate monomers to provide a selected weight ratio of monomers, solvent and initiator, at a polymerization temperature, and
   (b) introducing separate feed streams of vinylpyrrolidone and vinyl acetate monomers, solvent and initiator into said reactor at predetermined rates, over a given period of time.

2. A process according to claim 1 wherein the copolymer of vinylpyrrolidone and vinyl acetate has a weight ratio of 60–80 to 20–40.

3. A process according to claim 2 wherein said ratio is about 60/40.

4. A process according to claim 1 wherein the initial precharge has a concentration of 5–30% by weight of the total batch.

5. A process according to claim 1 wherein the monomer concentration is about 50–75% by weight.

6. A process according to claim 1 wherein the copolymer obtained has a K value of 10–40, a number average molecular weight of 6,000–50,000, and a cloud point of at least 60°–70° C.

7. A process according to claim 1 which also includes the steps of post-heating to reduce residual monomers to 100 ppm, and solvent-exchange to replace organic solvent with water.

8. A process according to claim 7 which also includes the steps of drying the aqueous solution to provide the copolymer as a powder.

9. A process according to claim 1 wherein the initiator is t-amylperoxypivalate or 2,2'-azobis-2-methylbutane nitrile, or mixtures thereof.

10. A process according to claim 1 wherein the separate feeding rates of vinylpyrrolidone and vinyl acetate is about 1.5 by weight, which corresponds to a 1:1 mole ratio, provides a vinylpyrrolidone to vinyl acetate conversion ratio, during polymerization by weight, of about 1.5.

11. A process according to claim 10 wherein the weight ratio of vinyl pyrrolidone to vinyl acetate in the initial charge is about 0.62.

* * * * *